(12) United States Patent
Tentij et al.

(10) Patent No.: US 6,513,129 B1
(45) Date of Patent: Jan. 28, 2003

(54) SYSTEM AND METHOD FOR MANAGING FAULTS USING A GATEWAY

(75) Inventors: Maarten Peter Tentij, Annandale (AU); Jeffrie David MacDonald, Erskineville (AU)

(73) Assignee: Objective Systems Integrators, Inc., Folsom, CA (US)

( * ) Notice: Subject to any disclaimer, the term of this patent is extended or adjusted under 35 U.S.C. 154(b) by 0 days.

(21) Appl. No.: 09/345,634

(22) Filed: Jun. 30, 1999

(51) Int. Cl.⁷ .................................................. G06I 11/30
(52) U.S. Cl. ................................ 714/4; 714/26; 714/48
(58) Field of Search ............................... 714/4, 43, 48, 714/26, 57, 5

(56) References Cited

U.S. PATENT DOCUMENTS

| | | | | |
|---|---|---|---|---|
| 5,159,597 A | * | 10/1992 | Monahan et al. ............... 714/2 |
| 5,428,619 A | * | 6/1995 | Schwartz et al. ........... 706/916 |
| 5,440,688 A | * | 8/1995 | Nishida ....................... 714/30 |
| 5,483,637 A | * | 1/1996 | Winokur et al. .............. 714/26 |
| 5,513,343 A | * | 4/1996 | Sakano et al. ................ 706/50 |
| 5,666,481 A | * | 9/1997 | Lewis .......................... 714/15 |
| 5,696,486 A | * | 12/1997 | Poliquin et al. ............ 340/506 |
| 5,761,502 A | * | 6/1998 | Jacobs ................... 379/221.09 |
| 5,764,955 A | * | 6/1998 | Doolan ........................ 709/223 |
| 5,768,501 A | * | 6/1998 | Lewis .......................... 714/25 |
| 5,777,549 A | * | 7/1998 | Arrowsmith et al. ........ 340/506 |
| 5,790,780 A | * | 8/1998 | Brichta et al. ................ 714/40 |
| 5,805,785 A | * | 9/1998 | Dias et al. .................... 714/20 |
| 6,000,045 A | * | 12/1999 | Lewis ......................... 709/223 |
| 6,006,016 A | * | 12/1999 | Faigon et al. ................. 714/26 |
| 6,131,112 A | * | 10/2000 | Lewis et al. ................. 709/207 |
| 6,147,975 A | * | 11/2000 | Bowman-Amuah ......... 370/232 |
| 6,205,563 B1 | * | 3/2001 | Lewis ......................... 709/223 |
| 6,253,339 B1 | * | 6/2001 | Tse et al. ..................... 370/216 |
| 6,269,396 B1 | * | 7/2001 | Shah et al. .................. 709/223 |
| 6,353,854 B1 | * | 3/2002 | Cromer et al. .............. 709/220 |

\* cited by examiner

Primary Examiner—Robert Beausoleil
Assistant Examiner—Gabriel L. Chu
(74) Attorney, Agent, or Firm—Fulbright & Jaworski L.L.P.

(57) ABSTRACT

The present invention provides an improved fault management system and method. In one embodiment, the system includes a gateway and a management processor system. The gateway is communicatively connected to a network for receiving alarm incidents from the network. The gateway has a rule engine for (1) selecting a control object from a set of control objects based on information from the alarm incident, and (2) processing the selected control object. The management processor system has a processor for processing configuration to objects in response to the selected control object for implementing fault management objectives defined by at least one user.

34 Claims, 8 Drawing Sheets

FIG. 3B

| LAYERS/ ASPECTS | FAULT (F) | CONFIGURATION (C) | ACCOUNTING (A) | PERFORMANCE (P) | SECURITY (S) |
|---|---|---|---|---|---|
| BUSINESS 162 | RAS QUALITY ASSURANCE <br> ALARM SURVEILLANCE <br> FAULT LOCALIZATION <br> FAULT CORRECTION <br> TESTINT | INSTALLATION <br> PROVISIONING <br> STATUS AND CONTROL | USAGE MANAGEMENT | PERFORMANCE QUALITY ASSURANCE <br> PERFORMANCE MONITORING <br> PERFORMANCE MANAGEMENT CONTROL <br> PERFORMANCE ANALYSIS | DETECTION <br> CONTAINMENT AND RECOVERY <br> SECURITY ADMINISTRATION |
| SERVICE 164 ||||||
| NETWORK 166 ||||||
| ELEMENT 168 ||||||

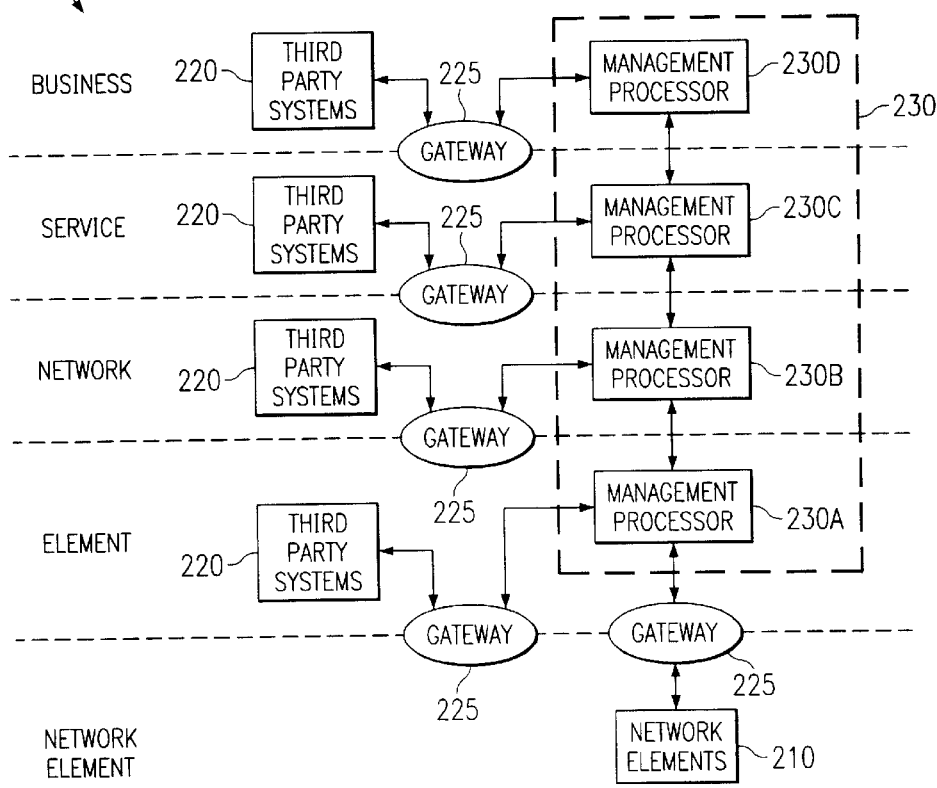

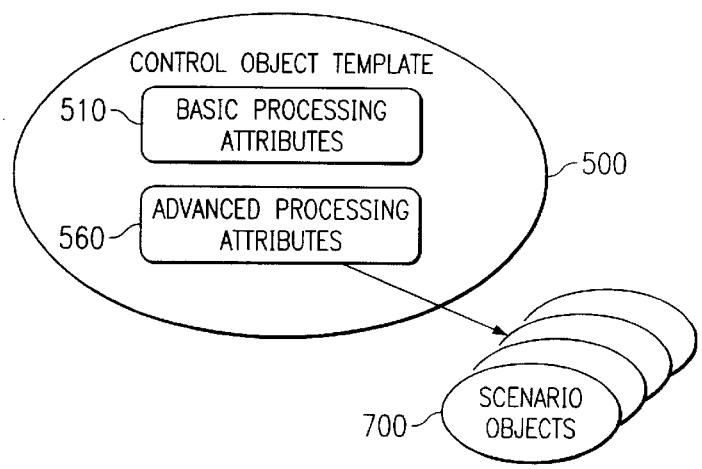

FIG. 8B

```
              BASIC ATTRIBUTES
       511—*  CONTROL OBJECT NAME
       513—*  CONTROL OBJECT GROUP
       515—*  ALARM TYPE
       517—*  PROBLEM CAUSE
       519—*  SEVERITY
       521—*  CLEAR TYPE
       523—*  E-MAIL LIST
       525—*  DESCRIPTION
510    527—*  DETAILED DESCRIPTION 1
       529—*  DETAILED DESCRIPTION 2
       531—*  GENERATE ALERT
       533—*  LOG ALERT
       535—*  ENABLE BEHAVIOR
       537—*  TIMEOUT
       539—*  MANUAL CLEAR
       541—*  TROUBLE TICKET
       543—*  USER NOTES
       545—*  CREATE INFORMATION
       547—*  UPDATE INFORMATION
```

FIG. 8C

```
            ADVANCED ATTRIBUTES
      561—*  ALTERNATE EVENT
      563—*  SPECIAL PRE-PROCESS
      565—*  SPECIAL POST-PROCESS
      570—*  CORRELATION SCENARIO    560
      590—*  THRESHOLD SCENARIO
      610—*  ESCALATION SCENARIO
      630—*  SUPPRESSION SCENARIO
```

FIG. 8D

CORRELATION SUB-ATTRIBUTES

- 571 * CORRELATION SCENARIO
- 572 * CORRELATION EVENT
- 573 * AUTO CLEAR CORRELATION
- 574 * CORRELATION TIME
- 575 * CORRELATION MOs
- 576 * CORRELATION ALERT
- 577 * PRESENT MO LIST
- 578 * PRESENT ALERT LIST
- 579 * ABSENT MO LIST
- 580 * ABSENT ALERT LIST
- 581 * USER NOTES
- 582 * CREATE INFORMATION
- 583 * UPDATE INFORMATION

ESCALATION SUB-ATTRIBUTES

- 611 * ESCALATION SCENARIO
- 612 * ESCALATION EVENT
- 613 * ESCALATION TIME
- 614 * E-MAIL LIST
- 615 * ESCALATED SEVERITY
- 616 * ESCALATED DESCRIPTION
- 617 * GENERATED MOs
- 618 * GENERATED ALERTS
- 619 * GENERATED SEVERITIES
- 620 * GENERATED DESCRIPTIONS
- 621 * USER NOTES
- 622 * CREATE INFORMATION
- 623 * UPDATE INFORMATION

THRESHOLDING SUB-ATTRIBUTES

- 591 * THRESHOLDING SCENARIO
- 592 * THRESHOLDING EVENT
- 593 * THRESHOLDED SEVERITY
- 594 * MO NAME
- 595 * THRESHOLD ALERT
- 596 * COUNT
- 597 * INTERVAL
- 598 * USER NOTES
- 599 * CREATE INFORMATION
- 600 * UPDATE INFORMATION

SUPPRESSION SUB-ATTRIBUTES

- 631 * SUPPRESSION SCENARIO
- 632 * SUPPRESSION EVENT
- 633 * SUPPRESSION SEVERITY
- 634 * SUPPRESSION THRESHOLD
- 635 * SUPPRESSER EQUIPMENT RANGE
- 636 * SUPPRESSER MOs
- 637 * SUPPRESSER ALERTS
- 638 * SUPPRESSED EQUIPMENT RANGE
- 639 * SUPPRESSED MOs
- 640 * SUPPRESSED ALARMS
- 641 * SUPPRESSED SEVERITIES
- 642 * WAIT TIME
- 643 * USER NOTES
- 644 * CREATE INFORMATION
- 645 * UPDATE INFORMATION

SYSTEM AND METHOD FOR MANAGING FAULTS USING A GATEWAY

BACKGROUND OF THE INVENTION

The information-communication industry is currently undergoing tremendous change from the constant evolution of new technologies and changing market conditions. As a result, network and information service providers such as telephone, cable, and wireless carriers, Internet Service Providers and utility companies all have the need to rapidly deploy new systems and system elements and alter their existing management systems to accommodate evolving business and network requirements. These requirements include the ability to integrate existing network equipment and systems with new elements and applications, customize existing systems and applications, and scale systems to accommodate growing networks and traffic volumes.

One area of management involves fault management. Fault alarm incidents (or messages) are routinely generated for the various components of a network to allow the service provider to monitor the operational state of the network. Fault management systems generally receive and process these alarm incidents in accordance with fault management objectives as defined by the service provider. Unfortunately, however, current fault management systems can be difficult to implement and modify as the network, along with management objectives, change over time. In addition, existing systems are inefficient with substantially all of the management processing occurring in a centralized management processor system.

Accordingly, what is needed is an improved fault management system and method.

SUMMARY OF THE INVENTION

The present invention provides an improved fault management system and method. In one embodiment, the system includes a gateway and a management processor system. The gateway is communicatively connected to a network for receiving alarm incidents from the network. The gateway has a rule engine for (1) selecting a control object from a set of control objects based on information from the alarm incident, and (2) processing the selected control object. The management processor system has a processor for processing configuration objects in response to the selected control object for implementing fault management objectives defined by at least one user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3B shows a table including the management layers of FIG. 3A with associated functional groups.

FIG. 4 depicts one embodiment of a management system for managing and providing network services.

FIG. 8A shows one embodiment of a fault management control object class.

FIG. 8B shows embodiment of a list of basic processing attributes for the control object class of FIG. 8A.

FIG. 8C shows embodiment of a list of advanced processing attributes for the control object class of FIG. 8A.

FIG. 8D shows one embodiment of lists of correlation, thresholding, escalation, and suppression sub-attributes for the advanced processing attributes of FIG. 8C.

DESCRIPTION OF THE PREFERRED EMBODIMENTS

A. Overview

Figure 1:
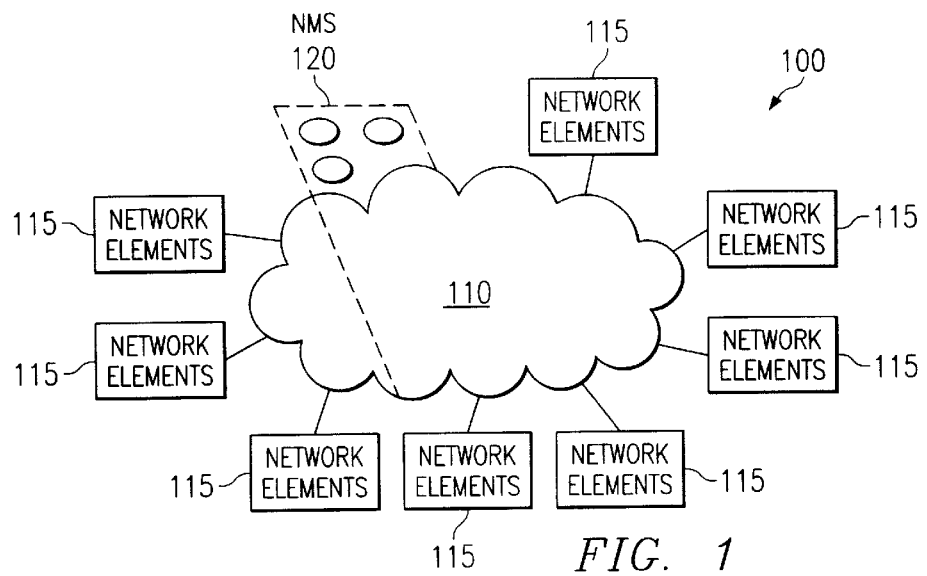
FIG. 1 is a functional depiction of the conceptual TMN relationship between a management system and the managed network.

One embodiment of the present invention operates in connection with an operations support systems (OSS) framework for managing networks and network services that are provided to customers. One example of an OSS framework is NetExpert™, which is available from Objective Systems Integrators of Folsom, Calif. This OSS framework is based on the standard Telecommunication Network Management (TMN) architecture promulgated by the International Telecommunications Union. FIG. 1 functionally depicts the conceptual TMN relationship between OSS 120 and the managed network 110, which includes network elements 115. FIG. 1 illustrates the overseeing nature of OSS 120. Network elements 115 correspond to the physical modules and systems (e.g., switches, termination points, databases, sub-networks) that are."managed" by OSS 120. One of the aspects of the TMN paradigm is that it promotes interoperability between different components, systems, and networks within the managed "network" 110, regardless of their particular configurations and protocols. The present invention not only implements these TMN objectives, but also, provides an OSS (or at least Network Management System (NMS) sub-systems) that have improved efficiency and scalability over existing management systems.

Figure 2:
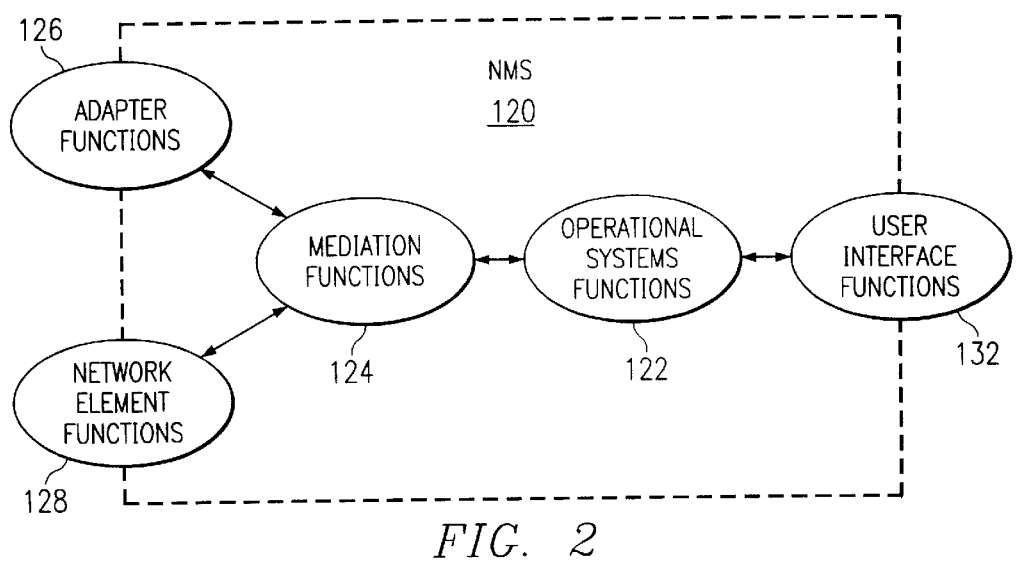
FIG. 2 shows a logical functional diagram of a TMN-based management system.

FIG. 2 shows a logical functional diagram of an OSS 120 consistent with the TMN standard. OSS 120 includes operational systems functions 122, mediation functions 124, adaptor functions 126, network element functions 128, and user interface functions 132. Mediation functions 124 communicatively link operational systems functions 122, adaptor functions 126, and network element functions 128 between one another. User interface functions 132 are linked to operational systems functions 122.

Operations systems functions 122 correspond to functions that manage the OSS. It performs various activities including obtaining management information such as acquiring alarm information from managed network elements, performing the required information processing activities on the network (e.g., correlating alarms, implementing service requests), and directing the managed elements to take appropriate action such as performing a test. Mediation functions 124 perform functions for mediating communications between the various functional blocks. It includes resources for storing, filtering, and translating data in order for information to be in a suitable form for a receiving functional block. For example, network element information may arrive at the NMS 120 packaged in various protocols such as X.25, Protocol 95, and BX.25. Adaptor functions 126 interface communications between the managed network 110 and third-party systems not necessarily managed by the NMS 120. Network element functions 128 correspond to the actual physical elements that make up the network 110. Incidents (or information packets) corresponding to the actual managed network elements are provided to the operations systems functions 122 via the mediation functions 124 in various manners. Some network elements (e.g., a switch) may generate and transmit its own incidents while others (e.g., a router or circuitpack) may be managed by an element manager, which generates and transmits the incidents for its managed elements. Finally, the user interface functions 132 provide to human users access to the operational Hi systems functions 122. Note that the adaptor, network element, and user interface functions are represented as being partially in and out of the OSS 120 because they are part of the system, but they also interface with the real physical world.

Figure 3A:
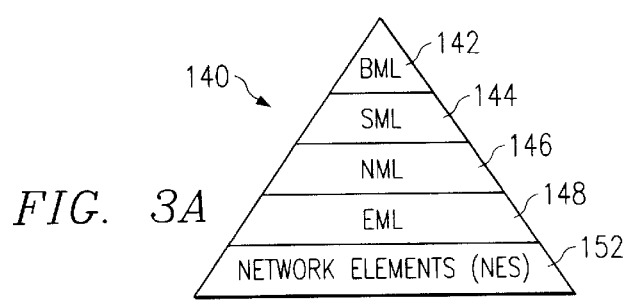
FIG. 3A diagrammatically shows the various TMN management layers.

As shown in FIG. 3A with management layer triangle 140, the TMN standard abstracts four different layers for managing a network through an OSS framework. These layers include business management layer 142, service management layer 144, network management layer 146, and element management layer 148. Also fit into this conceptual depiction is a network element layer 152, which interfaces between the physical network and the NMS 120 through the element layer 148. Network element layer 152 corresponds to the network element fimctions 128 from FIG. 2. The element layer 148 is the lowest layer in the model; it corresponds to (abstracts) the most fundamental aspects of the network including its physical components and systems. The next layer upward is the network layer 146. It generally corresponds to (abstracts) the network's higher-level components and interconnections. The next upward layer is the service layer 144. This layer generally corresponds to (abstracts) the nature of the services (e.g., number and type, of ports, quality) provided to subscribers or clients of the network. (The term client is used broadly and covers any type of network client including clients within an intranet or subscribers to a network service provider such as a telephone, wireless, cable, or Internet service provider, for example.) Finally, the business layer 142 corresponds to (abstracts) business aspects of the network such as market performance, and profit and loss centers.

The TMN architecture also articulates general functional groups that are to be managed across the various network management layers. These functional groups include fault, configuration, accounting, performance, and security. FIG. 3B shows table 160, which includes management layer rows (business layer 162, service layer 164, network layer 166, and element layer 168) and functional group columns (fault 172, configuration 174, accounting 176, performance 178, and security 182). The depicted functional categories, which apply to each layer, are derived from the TMN architecture (M.3200).

B. Management System

FIG. 4 shows one embodiment of a management system 200 for performing one or more of the FCAPS (fault, configuration, accounting, performance, and security) functions across the various management layers. Management system 200 includes gateways 225 and management processor system 230, which includes management processors 230A, 230B, 230C, and 230D (for the element, network, service, and business layers, respectively). As shown in FIG. 4, service management processor 230C is communicatively interconnected between the network and business management processors 230B and 230D, respectively. Likewise, network management processor 230B is interconnected between the element management processor 230A and the service management processor 230C. The element management processor 230A is linked through gateway 225 to the managed network elements 210 for sending commands to and receiving incidents from the managed network elements. Thus, the element management processor 230A serves as the interface for the management processor system 230. Management processor system 230 is also connected to third party systems 220 through gateways 225.

Managed network elements (or network elements) 210 correspond to the various elements and associated element managers of the managed network. (This Managed network elements block 210 corresponds to the network elements functions 128 and network elements 115 from FIGS. 2 and 1, respectively.) Each managed element provides (either directly or through an element manager) an incident message that includes pertinent information about a particular element. For example, an incident for a switch could be an alarm incident that identifies the switch and indicates that some portion thereof has failed. With networks being composed of elements from different vendors, incidents can vary in form (e.g., different protocols such as X.25, HTP/IP, Ethernet, Serial Asynchronous (RS-232), TCP/IP, SNMP, CMIP) from one element to another. Accordingly, incident-receiving gateway(s) 225 include, among other things, a rule engine for (1) identifying, parsing, and normalizing incoming incidents, and (2) performing basic processing tasks.

Normalizing involves translating (or mapping) the incident into a suitable, consistent form (e.g., ASCII), which may be discernable within the entire management system 200. Identifying and parsing involves identifying the incident's source and associated management level so that it may be processed in the correct management processor (i.e., element 230A, network 230B, service 230C, or business 230D). Most (but not all) of the incidents received from network elements 210 will be element layer incidents because these incidents correspond to signals from the physical network "elements." However, incidents are not exclusively generated within the physical network itself Management processors 230A, 230B, 230C may also generate incidents for higher level layers and pass them upward to the corresponding management processor. For example, a given customer may have contracted for premium accessibility. This would correspond to a service layer function or issue. A number of physical network or element layer elements responsible for providing this service may be impaired. However, the elements themselves are not capable (or even in a position) to communicate this "service" problem to the system. Thus, the element and/or network management processors may determine, from an aggregate of element and/or network alarm incidents, that this customer's premium service is impaired. An appropriate service alarm incident would then be generated and provided to the service management processor 230C by the element and/or network management processors 230A, 230B, respectively.

This gateway 225 is also capable of performing basic processing tasks. In one embodiment (as will be discussed in more detail below), configuration objects, which include both control and scenario objects, are initiated and executed for performing management functions. The gateway 225, with its processing capability, selects and at least partially processes an initial control object in response to a received incident. In this manner, processing is more efficiently distributed between the management processor system 230 and the gateway 225 rather than exclusively occurring in the management processor system 230, which may be implemented with a centralized server. Moreover, while FIG. 4 depicts a single incident-receiving gateway, multiple incident-receiving gateways may actually be implemented with a centralized management processor system 230. Basic control object processing is performed in the distributed gateways with advanced processing being performed in the management processor system 230. However, cross element manager or cross domain processing would typically not be carried out in the gateways. In these embodiments, enhanced efficiency resulting from distributed processing over the multiple gateways becomes even more significant.

Figure 5A:
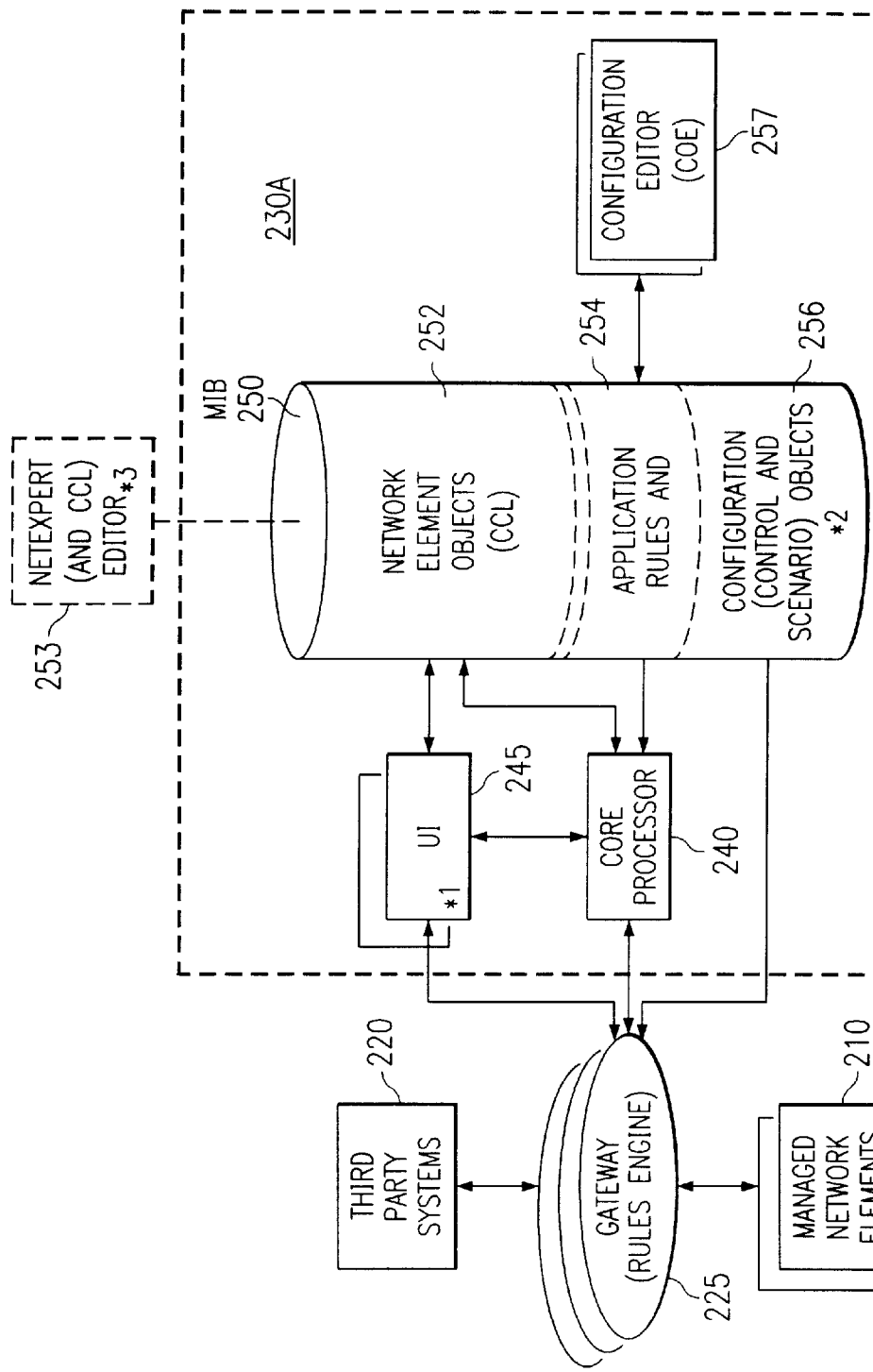
FIG. 5A shows one embodiment of a management processor for implementing a management system.
Figure 5B:
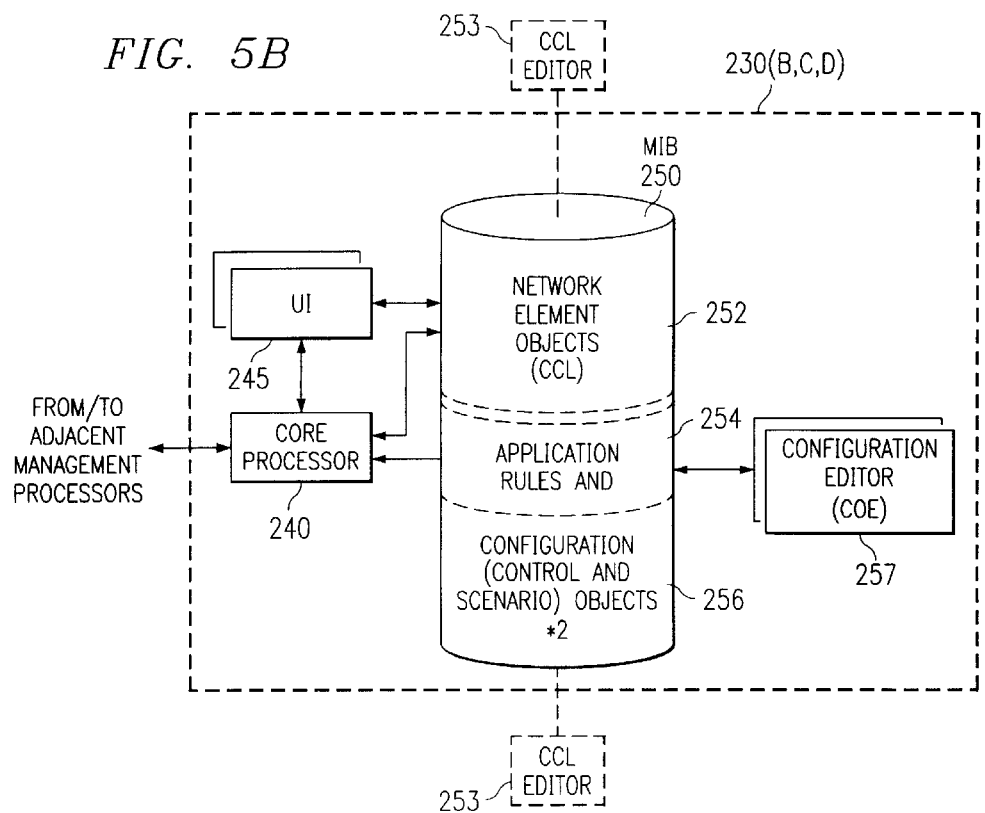
FIG. 5B shows another embodiment of a management processor for implementing a management system.

The management processor system 230, which includes management processors 230A, 230B, 230C, and 230D, performs basic, as well as advanced processing tasks, for managing or implementing a given function (e.g., fault, configuration, accounting, performance, security) across the various management layers. The management processor system 230 may be implemented on one or more connected servers. The individual processors 230A, 230B, 230C, 230D (which will be discussed below) may be physically, as well as conceptually, distinct from one another. FIGS. 5A and 5B show management processors 230A (FIG. 5A) and 230B, 230C, 230D (FIG. 5B) with more particularity. These depictions are essentially the same except that in FIG. 5A, an incident-receiving gateway 225 is included since it is connected to and communicates directly with the element management processor 230A in-the depicted management processor system 200. In this embodiment, the other management processors (230B, 230C, and 230D) essentially function the same as the element management processor 230A except they communicate with adjacent management processors and not directly with the incident-receiving gateway 225. The element management processor 230A will be discussed with the same general principles applying as well to the other management processors.

Management processor 230A includes core processor 240, user interface. 245 and management information base (MIB) 250. The core processor 240 is connected to the gateway 225, MIB 250, user interface 245, and to the upwardly adjacent network management processor 230B (not shown). The user interface is also connected to the MIB 250. Note that with the other management processors 230B, 230C, 230D in the depicted embodiment, the core processor 240 would be connected to upper and lower adjacent management processors and not to the incident-receiving gateway 225. MIB 250 further includes a network model objects section 252, application rules section 254, and configuration objects section 256. MIB 250 also has network model objects editor 253 for editing the network model objects section 252 and a configuration objects editor 257 for editing the configuration objects section 256. Note that with the element management processor 230A, MIB 250 and user interface 245 are also directly connected to the gateway 225. This allows the gateway 225 to select and process control objects in response to receiving an incoming incident. It should also be noted that user interface 245 may actually comprise multiple user interfaces located at different sites. For example, with multiple gateways 225, a separate user interface 245 could be provided for each gateway 225, as well as for the management processor.

Core processor 240 includes a processing (or rule) engine for performing tasks including advanced processing of configuration objects (which include both control and scenario objects) that are initiated from one or more control objects selected and processed in the gateway 225. This processing is responsive to the incident's included parameters, as well as to the particular attributes associated with the selected and initiated control objects. Object processing in gateway 225 and core processor 240 carries out the predefined policies (or objectives) for managing a given function(s) as defined by a user.

User interface 245 may be any suitable device (or devices) such as a display terminal for providing users with interactive access to the management system 200 through gateway 225 and/or management processors 230A, 230B, 230C, 230D. As discussed above, the user interface may actually comprise a plurality of user interfaces depending upon the particular requirements of the managed network.

MIB 250 is an information base for storing objects and rules for managing the network tag in response to incoming incidents. In one embodiment, MIB 250 comprises Network elements section 252, application rules section 254, and configuration objects section 256.

The network model objects section 252 stores network model objects, which are objects that correspond to the managed elements of the network. (It should be noted that these managed elements can exist in any management layer and not simply the element layer.) These element objects contain attributes that reflect the state of the actual, physical element. Thus, the entirety of element objects within this section (for each of the management layers) model the network and enable the management system 200 to track and model the state of the managed network.(It should be recognized, however, that various embodiments of the present invention may not use or require complete or even partial network models.)

Figure 6:
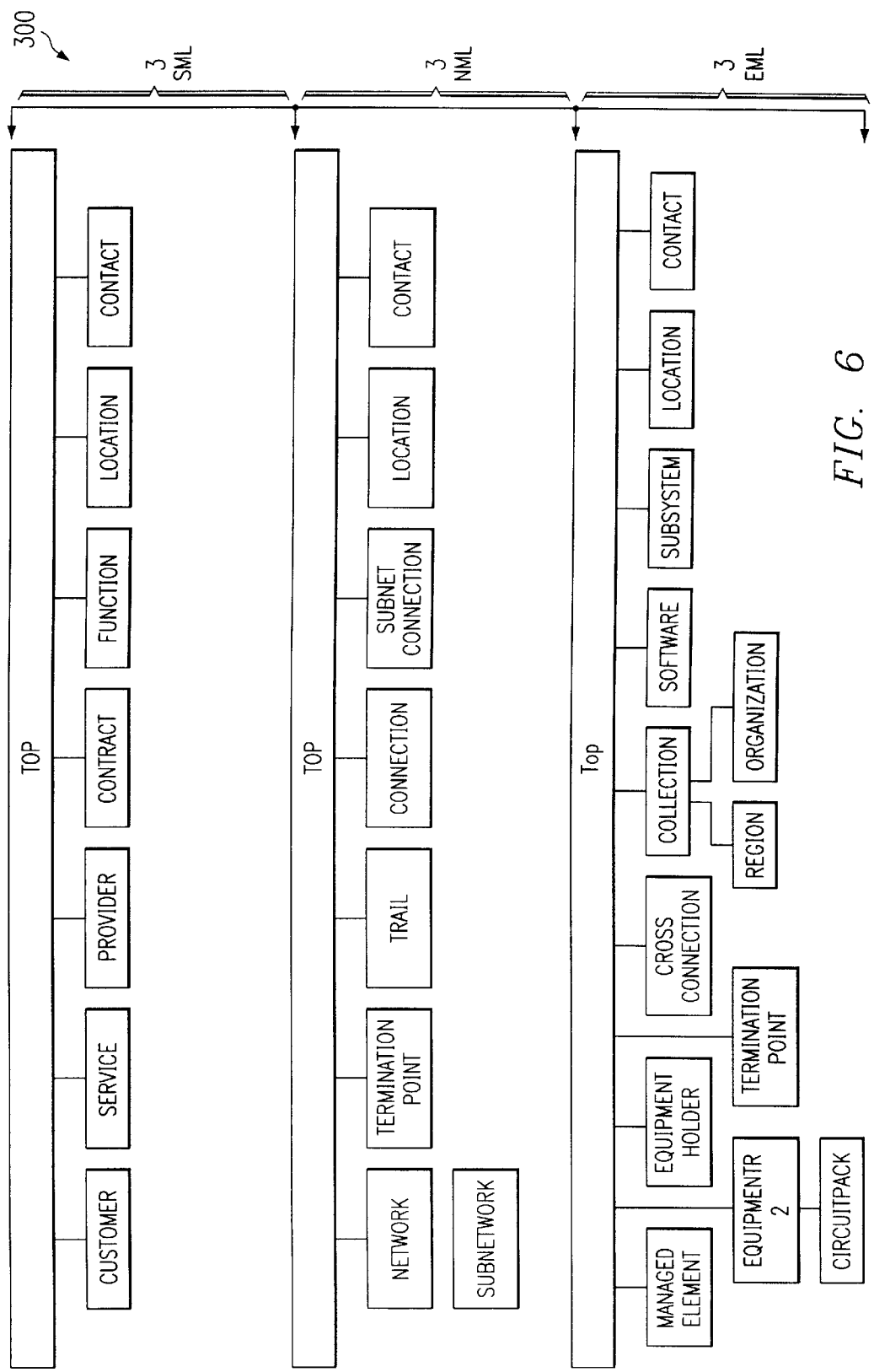
FIG. 6 illustrates one embodiment of a class tree for object classes within the element, network, and services layers.

FIG. 6 shows one embodiment of a class tree 300 for network model object classes within the element, network, and service layers. Class tree 300 includes service layer object classes 310, network layer object classes 320, and element layer object classes 330. The network model objects model and track the state of the network, which is useful in various OSS applications such as configuration management. In addition, the network model objects maintain records for the managed elements and provide an interface model for conveying information (e.g., alarm status) through the user interface to a user.

The application rules section 254 comprises reusable (generally applicable) application logic that may be loaded and executed by gateway 225, as well as by core processor 240. These application rules provide gateway 225 and core processor(s) 240 with an operational framework for both initiating and processing configuration objects on the one hand and building, modifying, and using network model objects on the other hand. The MIBs in the various management processors 230A, 230B, 230C, and 230D have different configuration (control, scenario) and network model objects, but can use the same application rules.

The configuration objects section 256 includes the control and scenario objects for performing basic and advanced processing for managing the assigned function of the management system 200. Control objects include attributes and methods (or operators) for performing basic processing tasks. In turn, scenario objects include attributes and methods for performing advanced processing tasks. Scenario objects are invoked by control objects when such advanced processing is required and called upon by the control object.

The network model objects editor 253 edits the network model objects within the network model objects section 252. Depending upon the particular embodiment, it could include a work-station for manually augmenting or otherwise modifying this set of model objects. For example, a user could add an object for a router that is to be added to the network.

Configuration editor 257 is used for editing the configuration objects within the configuration objects section 256. Configuration objects are edited in order to change how incoming incidents are processed so as to effectuate the objectives or policies of the management system. With the use of configuration objects, these policies can be readily changed. Rather than having to modify a particular rule set or procedure for each possible incident, only high-level objects need to be changed depending upon the general applicability of the policy change. These changes affect the way in which the system responds to the incoming incident (s) associated with the configuration objects. This is but one benefit in using configuration objects for processing incidents.

In operation, an incoming incident is initially normalized at gateway 225. Once normalized, the incident causes a rule engine in the gateway 225 to search for the "closest" control object to initially process the control object. Once identified, this initial control object is processed by the gateway 225 to carry out basic processing tasks. Based on the parameters of the incident, this initial control object causes a chain of one or more control objects to be further processed in the gateway and then in the core processor 240. Scenario objects may be invoked by control objects in order for advanced processing tasks (e.g., correlation in responding to a fault incident). Essentially, the incoming incident sets off a chain of control/scenario (configuration) object processing that causes the management system 200 to react to the incident consistent with an overall management scheme. With the present invention, this "scheme" may readily be changed (or maintained) as the network and its parameters are modified. By simply creating, modifying or removing the control and scenario objects, a user is able to not only vary how the incident is processed, but also, what control object is selected as the initial control object for an incoming incident. In one embodiment, the gateway rule engine uses a combination of hierarchical and relational logic for selecting the "closest" control object. As those of skill in the art will recognize, other artificial intelligence based matching techniques may be used. The incoming incident is matched, from very specifically to very generally, against a set of possible control object name strings. For example, an incident could include information about a network element including its domain, its function, and its specific assigned identification code. The rule engine would look for a control object name with all of these parameters; however, if not found, it could then select one with two or even just one of the parameters. (Ties could be broken with predefined rules.)

With this general network management system in mind, a fault management system of the present invention will now be discussed.

C. Fault Management System

Figure 7:
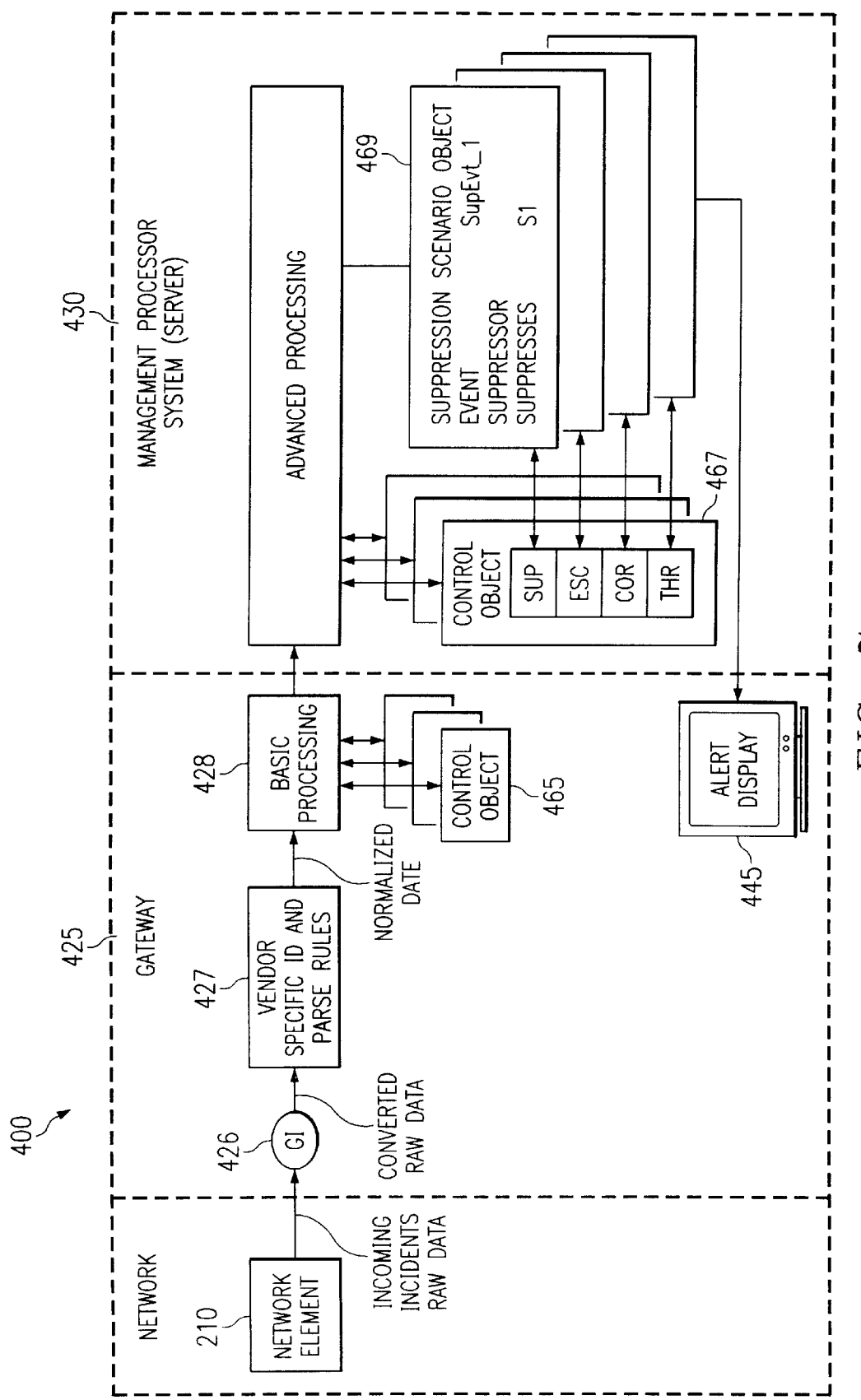
FIG. 7 shows one embodiment of a fault management system with a diagrammatic depiction of the processing flow of an incoming alarm incident.

FIG. 7 shows a fault management system (FMS) 400 that implements one embodiment of management system 200. Among other things, the fault management system 400 performs alarm surveillance, alarm clearing, reporting, correlation, suppression, escalation, and thresholding at all of the management layers: business, service, network, and element.

FMS 400 generally includes gateway 425, fault management processor system 430, and display terminal interface 445 for displaying to a user fault alerts (via an Alert Display) and for receiving from the user appropriate command and configuration information. Topological representations of the network and its state may also be included. Gateway 425 is interconnected between management processor system 430 and the network elements 210 for receiving incoming fault incidents from network elements and element managers. Display terminal interface 445 is connected to both the gateway 425 and the management processor system 430. In one preferred embodiment, gateway 425 actually comprises a plurality of distributed gateways. Accordingly, the display terminal interface comprises several display terminals for servicing the fault management processor system 430.

FIG. 7 diagrammatically depicts the processing flow of an incoming alarm incident. In operation, the network element 210 sends a raw alarm incident to the gateway 425 where it is received at gateway interface 426. It is passed to a normalization rule engine at 427 where it is normalized; that is, identification and parse rules are applied in order to translate it from a vendor specific form into a form that is amenable for processing throughout the system. Based on data from this normalized incident, the gateway 425 then selects at 428 the "closest" control object 465 and processes it. In doing so, the rule engine selects the control object whose name most closely matches the normalized incident data. Once the control object is selected, the attributes in the control object determine how the alarm incident will be processed. In some cases, advanced processing in the management processing system 430 will be required. The processed control object may cause one or more other control objects 467 and/or any necessary scenario objects 469 (e.g., for performing correlation or suppression) to be processed. The management processing system 430 would then take appropriate action such as displaying alert information on the display terminal interface 445. In other cases, the basic processing in the gateway 425 may directly cause, for example, an alert message to be displayed on the Alert Display.

1. Selecting the "Closest" Object

With the selection of the closest control object, the normalized alarm data is compared with a set of control object names to find the closest match. Values used to map the incoming alarm incident to the correct control object are extracted from the incoming alarm incident and placed into a form that is compatible with the naming scheme used for the control objects. In one embodiment, when comparing the formatted alarm against the control object list, the gateway rule engine searches from the very specific to the general. If no match is found, the default control object is used.

Control object names can be as specific as a particular type of alarm from a particular card in a particular network device, to as general as one alarm from any device. For example, fault management control could be specified at one or more of the following levels: alert name: AMO name, alert name:location, alert name:main element type, alert name:domain, alert name:parent equipment type, alert name:parent equipment id, alert name:equipment type, alert name:equipment id, alert name:any other alert attribute (such as severity). Although the current description of the invention uses the alert name as the primary key, this is not mandated, and a primary key such as equipment identifier, or type, can be used in its stead. As a simple example, consider the following list of control objects, which are named in the form and at the most particular level of alert name:AMO name. (Note that this list is ordered with increasing generality; a control object name does not necessarily have to include each component in the form.)

1. FMgO1000:A
2. FMgO2000:B
3. FMgO1000
4. FmgO2000
5. FMgODefault

If an incident that contains an AMO name of A and an alarm name of 1000 is received, the first control object, which has both of these indicia is chosen. The same is true of a 2000:B alarm incident (the second control object would be selected). However, if an incident that contains an AMO name of A and an alarm name of 2000 is received, the fourth control object, to which has an alarm name of 2000 is chosen since there is no control object with the 2000:A combination. Similarly, if an incident that contains an alarm name of 3000 is received, the fifth (or default) control object is chosen because there is no control object that has an alarm name of 3000.

A combination of the above control object naming styles can be used, for example, alert name:domain:location:main element type could be implemented. In addition, if possible, the particular naming convention should ideally be specified in the element manager for that alarm stream.

Additional or exceptional configuration objects can be created when there is a need for the system to know the difference between control applied to one device set as opposed to another main type.

2. Fault Management Control Objects

The control object contains attributes that dictate system response to an incoming alarm. Basic functionality such as alert generation, logging, forwarding is described by the control object itself. Initiation of advanced functions (e.g., Suppression, Escalation, Correlation, and Thresh-holding) are handled through scenario objects initiated by a control object. Finally, the alarm incident is processed and FMS 400 responds in accordance with the pre-defined policies of the system (e.g., display fault alert).

FIG. 8A shows one embodiment of a fault management control object class (or template) 500 having basic processing attribute variables 510 and advanced processing attribute variables 560. These attributes determine how an alarm incident will be processed. When creating specific control object instances, a user may select appropriate values for these attributes so that the incoming fault incidents are managed as desired by the user. Depending upon the particular advanced processing attribute values (as discussed below), scenario objects 700 may be initiated by a control object instance.

a. Basic Processing Attributes

With reference to FIG. 8B, the basic processing attribute 510 include Control Object Name 511, Control Object Group 513, Alarm Type 515, Problem Cause 517, Severity 519, Clear Type 521, E-mail List 523, Description 525, Detailed Desc. 1 527, Detailed Desc. 2 529, Generate Alert 531, Log Alert 533, Enable Behavior 535, Timeout 537, Manual Clear 539 Trouble Ticket 541, User Notes 543, Create Info. 545, and Update Info. 547.

The Control Object attribute 511 defines the name of a given control object instance. Control Object Group 513 defines the group to which the given control object instance belongs. The gateway 425 parse and identification rule engine has its own "element managers" that use the control objects belonging to the-groups they are assigned to find the correct behavior specification for the incoming alarm incidents. The Alarm Type attribute 515 contains the X.733/M.3100 alarm category for the alarm behavior being defined. It is related to the next field (Probable Cause 517). This value is forwarded across the normalization rule engine if forwarding is selected. The Probable Cause attribute 517 describes the likely cause-of this type of alarm based on the X.733/M.3100 probable cause related to the alarm type 515. It is related to the previous field (Alarm Type 515). This value is also forwarded across the normalization rule engine within gateway 425.

The Severity attribute 519 defines the severity level associated with a given control Object instance. Its possible values include critical, major, minor, warning, and indeterminate. It is used to overwrite the alarm severity value received from the Element Manager (or device); it invokes a user to select a severity from a pick list. EM means apply the severity received from the Element Manager. A value of AD indicates the severity defined in the Alert Definition should be used.

The Clear Type attribute 521 is used to control alert clearance behavior. Its possible values include ACK, MAN, RESET, and FULL with its default being RESET. ACK causes the alert to clear from the system on receipt of a clear indication from the equipment only if the alert was manually acknowledged. If unacknowledged, the alert severity will be set to indeterminate when the clear is received. MAN causes any clear messages received from the Element Manager or device to be ignored. These alerts should always be manually cleared. RESET causes the alert severity to be set to "indeterminate" when a clear for the alert is received. The indeterminate event must then be manually selected and cleared to remove it from the Alert Display. FULL causes the alert to fully clear from the Alert Display.

The Email List attribute 523 identifies the email addresses of the people to be automatically notified when the alert using the control object is generated. The default is blank; that is, nobody would be notified via email. This attribute may also reference a contact object. This contact object may list several possible ways of contacting the user.

The Description attribute 525 is used to overwrite the alarm description received from the Element Manager or device. If left empty, the EM description is used.

The Detailed Desc. 1 attribute 527 is used to overwrite the alarm description received from the Notification ID (NM). If left empty, the NID description is used. The NID is a unique tag used to distinguish this alert. This number is logged to the database if logging is turned on and can be used for reference.

The Detailed Desc. 2 attribute 529 is used to provide additional or supplementary alarm information. The rules may be written to fill this with information from the incoming alarm message if this attribute is left unassigned.

The Generate Alert attribute 531 is a boolean variable with a default of True. If its value is True, it causes the system to generate an alert when that control object is triggered. If False, an alert is not generated. This allows the system to log the alert or to perform advanced fault management functions on the alert without generating it.

The Log Alert attribute 533 is used to control alert logging behavior. Its possible values are 0, 1, and 2 with a default value of 2.0 means do not log the alert details when this control object triggers system response. 1 means log the alert details only if the alert is generated on the Alert Display. 2 means always log the alert details.

The Enable Behavior attribute 535 is a boolean variable with a default of True. If False, the system includes this control object when searching for a match against the incoming alarm incident. If False, the control object will not be part of the list of possible "closest" control objects. This allows a user to temporarily deactivate control objects, or to activate control objects for special occasions or events. If an unspecified control object (alert name only) is disabled, system default behavior is applied.

The Timeout attribute 537 defines a number of minutes. It is used as a timeout to set the number of minutes for the system to wait before clearing the alert. This is useful with alarms such as an open door to a piece of equipment that is not cleared by the equipment once the fault condition is resolved.

The Manual Clear attribute 539 is of boolean type with a default of True. If True, the alarm incident is permitted to be cleared manually. This is used to control manual clearance behavior. If this box is checked, manual clearance is permitted. Note that for correlation alerts, manual clear should be True only if the alert needs to be manually cleared in exceptional circumstances. If an alert is selected on the Alert Display to be manually cleared, and the value is False, the alert will remain on the alert display.

The Trouble Ticket attribute 541 is also of boolean type with a default of False. If True, the system automatically generates a trouble ticket when that control object is triggered.

The User Notes Attribute 543 includes documentation information about the control object. It is blank if nothing is entered by a user.

The Create Info. attribute 545 shows the time/date/user ID information for when the control object was created. Its values are automatically generated. Accordingly, value assignment from a user is not required.

The Updated attribute 547 is also automatically defined. It shows the time/date/user ID information for when the control object was last updated.

b. Advanced Processing Attributes

With reference to FIG. 8C, advanced processing attribute variables 560 include Alternate Event 561, Special Pre-Process 563, Special Post-Process 565, Correlation Scenario 570, Threshold Scenario 590, Escalation Scenario 610, and Suppression Scenario 630.

The Alternate Event attribute 561 includes the name of an alternate event if defined by a user; otherwise, this attribute remains empty. The use of an Alternate Event name means that, at run time, when an alarm incident matches the control object, the system will bypass (skip) default system functionality and instead uses the Alternative event instead. This can be configured for informational alarm incidents where the system can use the information carried within the alarm and update some system attributes. The Heartbeat message is an example for such alarms.

The Special Pre-Process attribute 563 either includes the name of an event or remains empty.

This entered event runs before system default functionality is triggered. It can be used to pre-set attributes that the system uses during run time. As an example this event can be used to read a text file or run a database command and pass the result to the system through system standard attributes.

The Special Post-Process attribute 565 also includes the name of an event or remains empty.

If entered, the event runs after the system processes the alarm incident. It can be used to write results to an external database or text file, or to fax alarm details. Writing system attributes to a text file for debug purposes is a good example on where this event can be used.

The following Correlation 570, Threshold 590, Escalation 610, and Suppression 630 Scenario attributes all use a pick list from which a user can select an existing scenario, or a configuration object editor that allows a user to create a new "custom" scenario.

The Correlation Scenario attribute 570 identifies a particular correlation scenario (if any) to be invoked when the control object is initiated. If desired, a user assigns a correlation scenario in this attribute. Such a scenario may be selected from a pre-existing group or created by the user.

When an incoming alarm incident completes a predefined alarm pattern, a new "correlation" alert is generated on an Alert Display Window at the display terminal interface 445. All alerts comprising the alert pattern are then temporarily removed from the Alert Display Window. While the correlation alert is active, subsequent alarms which match the correlation pattern of the correlation alert are not displayed.

Correlation alerts should not be manually cleared. When an "alarm clear" for one of the alerts comprising the underlying correlation alert pattern is received from the EM or device, the "correlation" alert is automatically cleared from the Alert Display Window, if the Auto Clear attribute is set to True. The remaining alerts that were temporarily removed from the Alert Display, or which were suppressed before being generated as a result of the correlation alert being present, are regenerated. If the Auto Clear attribute is set to False, the underlying alerts will not be regenerated when the correlation alert pattern is no longer active.

There are two standard correlation methods: pattern correlation (Oust previously described), and Circuit correlation. Circuit Correlation works for links and circuits, where, if one or both ends of the link are in alarm, this indicates that the link is down.

The main difference between circuit correlation and pattern correlation is that circuit correlation searches a pre-populated table to identify the circuit components (a-end, b-end and circuit name). An alert name for the other end can be specified. If no alert name is provided, the same alert name as the incoming alert will be used. The absent alert conditions cannot be applied to the correlation scenario, and only a single network component (the circuit) can be alarmed.

When an alarm is received on one end, and if AND is selected for the present conditions, the other end is checked for the same alarm, or the alarm specified in the correlation scenario. (The other end is identified through a lookup table entry). If AND was specified and the conditions of the circuit correlation alarm are met, both alerts are hidden and a new alert is generated to indicate that the link (or circuit) is in alarm. If OR was specified, then the correlation alert will be generated whether or not the other end alert has been received. In this case, if the other end alert is received after the correlation alert has triggered, this alert will not be displayed, but will be regenerated when the correlation condition is no longer active (and Auto Clear is True), and if this alert has not been cleared in the meantime.

With reference to FIG. 8D, the correlation scenario attribute includes a plurality of sub-attributes 571–583. These sub-attributes include Correlation Scenario 571, Correlation Event 572, Auto Clear Correlation 753, Correlation Time 574, Correlation Mos 575, Correlation Alert 576, Present MO List 577, Present Alert List 578, Absent MO List 579, Absent Alert List 580, User Notes 581, Create Info. 582, and Update Info 583.

The Correlation Scenario sub-attribute 571 identifies the name of the correlation scenario related to the control object includes the attribute. The Correlation Event attribute 572 identifies an event name for the correlation scenario.

The Correlation Time 574 defines the time (in seconds) for the system to wait before generating the correlation alert.

If the pattern is no longer active after this period of time, correlation should not be initiated.

The Correlation Mos attribute 575 indicates a network component name. This attribute is used for identifying the network components against which the correlation alert must be generated. A symbol can be used to indicate that the location attribute value of the incoming alert should be substituted in the network component name. Note that any combination of symbols that represent attribute values can be used. A unix-like regular expression could also be used to specify which network components are to generate the correlation alert against.

The Correlation Alert attribute 576 identifies the name of the correlation alert to be generated when the correlation condition is satisfied.

The Present MO List attribute 577 is used to identify on which network components the alerts (fault conditions) must be present for the correlation to take effect. When naming the network component, a symbol can be used to indicate that the location attribute value of the incoming alert should be substituted in the network component name. Note that any combination of symbols that represent attribute values can be used. A unix-like regular expression may also be used to specify which network components should be present.

The Present Alert List attribute 578 is used to identify the alerts (fault conditions) that must be present for the correlation to take effect. Each present alert list entry should correspond to the network component name in the Present MO List.

The Absent MO List attribute 579 is used to identify which network components the alerts (fault conditions) must be absent from for the correlation to take effect. This list is related to the following field (Absent Alert List). When naming the network component, a symbol can be used to indicate that the location attribute value of the incoming alert should be substituted in the network component name. Note that any combination of symbols that represent attribute values can be used. A unix-like regular expression could also be used to specify which network components should be absent.

The Absent Alert List attribute 580 is used to identify the alerts (fault conditions) that are to be absent for the correlation to take effect. This list is related to the previous attributes (Absent MO List). Each absent alert list entry corresponds to the network component name in the Absent MO List.

The User Notes attribute 581 is used to store and document information about the correlation scenario.

The Create Info attribute 582 tracks and stores the time/date/user ID information for when this correlation scenario was created.

Likewise, the Update Info attribute 583 tracks and stores the time/date/user ID information for when this correlation scenario was last updated.

The Threshold Scenario attribute 590 identifies a particular threshold scenario (if any) to be invoked when the control object is initiated. If desired, a user assigns to the control object a threshold scenario in this attribute. Such a scenario may be selected from a pre-existing group or created by the user. If no threshold scenario is assigned, then a threshold scenario will not be initiated from the control object when it is processed.

Thresholding causes the generation of an alert to be delayed until specified conditions are met. These conditions can include the system receiving a specified number of alarms or alarm clears within a specified period of time.

Setting Threshold parameters allows alarm incidents that occur often to generate alerts on the Alert Display only when a certain number of alarms are received within a given time interval. In other words, when they reach a preset threshold. This is known as rate thresholding. Thresholding can also count the number of alert clears that are received in a given time before an alert is generated, this is fleeting Thresholding.

With thresholding, the number of occurrences of an alarm or alarm clear within a sliding time interval are recorded as they are received. If the required number of alarms are received, optionally for a specified severity level, within the required time interval, an alert is generated with the specified severity.

Different grades of thresholds for a given time interval can be set up. For example, 5 alarms in 10 minutes generates a minor alarm, 10 alarms in 10 minutes generates a major alarm, and 20 alarms in 10 minutes generates a critical alarm.

If additional alarms are received such that the threshold requirements for a higher severity level are satisfied, the severity of the alert is changed to reflect the new specified value. Clears will similarly decrement the count and severity level as a previous threshold is reached.

When a new thresholded alarm is received after the specified time frame, it sets the severity of the currently thresholded alert to indeterminate and a new threshold count starts.

There are two standard thresholding methods: rate thresholding and fleeting thresholding. Rate thresholding is handled by suppressing the number of alarms that are received until the threshold is reached for the alarm that is being thresholded, and then generating the threshold alert. This type of threshold can escalate or de-escalate because each clear received subtracts from the count of alarms. Different high-water marks can cause different severities to be applied to the alarm. Alarm clears are always recognized in threshold processing whether the Clear Type is set to manual or not. If an alert already exists on the Alert Display for the previous threshold—according to the internal threshold count—the severity level is adjusted as required, or if the threshold requirement is no longer satisfied for any severity level, the alert is removed from the Alert Display. Three ways for clearing a rate threshold include Clearing the threshold rate manually, automatically clearing when enough clears are received to bring the threshold level down to the lowest preset level, and automatically clearing when there are not enough alarms received during a preset interval of time and a new alarm of the specified type is received.

This latter method is handled by suppressing the alarms received until the required number of clears for the alarm that is being thresholded are received (that is, the alarm has come and gone a number of times within a specified period of time). Then the threshold alert is generated.

If Clear Type is set to manual, this does not prevent the clears from counting up. (Fleeting alarms rarely de-escalate.) So there is no logical inconsistency between setting Clear Type=MAN and configuring a control object for fleeting alarms.

Different high-water marks cause different severities to be applied to the alarm. This function counts the number of clears received. If a new (different) alert is generated as a result of a fleeting alarm condition, a manual clear is required because the Element Manager never sends a clear for this alarm.

Two ways to clear a fleeting threshold include clearing the threshold rate manually and clearing it when there are not enough alarms received during a preset interval of time and a new alarm of the specified type is received.

As shown in FIG. 8D, the Threshold Scenario attribute 590 includes a plurality of sub-attributes 591–600. These sub-attributes include Thresholding Scenario 591, Thresholding Event 592, Threshold Severity 593, MO Name 594, Threshold Alert 595, Count 596, Interval 597, User Notes 598, Create Info. 595, and Update Info. 600. Each of these sub-attributes (or attributes) will now be discussed.

The Thresholding Scenario attribute 591 identifies the name of the thresholding scenario (if any) for the control object.

The Threshold Event attribute 592 includes an event name for identifying the type of thresholding event.

The Thresholded Severity attribute 593 identifies a severity level (critical, major, minor, warning, indeterminate, or blank with a default value of blank. This attribute is used to specify a severity for the alert to trigger thresholding. If blank is specified, alerts of all severities will be thresholded. If a severity is specified, then only alerts with this severity will be thresholded.

The MO Name attribute 594 is used to identify the name of a different network component on which an alert is to be generated when the thresholding condition is satisfied. If no network component name is provided, thresholding generates on the incoming network component. When naming the network component, a symbol can be used to indicate that the location attribute value of the incoming alert should be substituted in the network component name. Note that any combination of attribute values can be used. A unix-like regular expression could also be used to specify which network components the alerts should be generated on.

The Threshold Alert attribute 595 identifies the name of a different alert to be generated when the thresholding condition is satisfied. This alert name should already be defined (e.g., by a user). If no alert name is provided, the threshold alert is generated on the control object definition alert name, that is, the incoming alarm name.

The Count attribute 596 has count values for each severity "box" (clear, warning, minor, major, and critical) with a default of blank in each box. The scenario uses the value in each severity box to set the number of alarms of that severity you want the system to wait before the threshold alert changes to the matching severity.

The Interval attribute 597 identifies the number of days, minutes, and hours, respectively, to indicate the time within which alarms must be received for a threshold alert to be generated. This attribute does not indicate a pause between when the threshold condition is met and when the Threshold alarm is to be generated. As such there is only one Wait Time value required and not a list.

The User Notes attribute 598 stores information about the thresholding scenario.

The Create Info 599 tracks and stores the time/date/user ID information for when this thresholding scenario was created.

The Update Info attribute 600 tracks and stores the time/date/user ID information for when this thresholding scenario was last updated.

The Escalation Scenario attribute 610 identifies a current escalation scenario (if any) to be initiated by the control object.

Escalation causes the alert severity or description of the alert to be changed, a new alert to be generated, or an e-mail to be sent if the alert is not acknowledged (or cleared) within a specified period of time. If the alert is acknowledged or a clear message is received during the wait time, escalation behavior is canceled.

The Escalation Scenario attribute 610 has a plurality of attributes (or sub-attributes) 611–623. These attributes include Escalation scenario 611, Escalation Event 612, Escalation Time 613, Email List 614, Escalated Severity 615, Escalated Description 616, Generated Mos 617, Generated Alerts 618, Generated Severities 619, Generated Description 620, User Notes 621, Create Info. 622, and Update Info. 623.

The Escalation Scenario attribute 611 identifies the name of the Escalation scenario (if any) for the given control object.

The Escalation Event attribute 612 identifies a method for escalating alarms.

The Escalation Time attribute 613 specifies the time in seconds within which alarms must be received for the escalation to be initiated.

The Email List attribute 614 stores an email addresses of the people to be automatically notified when the escalation criteria is met. In the future, a contact object may be referenced in its stead.

The Escalated Severity attribute 615 has possible severity values including blank, critical, major, minor, warning, indeterminate, and AD with a default of blank. This attribute is used to set the severity to apply to the alert when it's escalated. AD indicates the severity defined in the Alert Definition that is to be used. blank indicates the severity should not change.

The Escalated Description attribute 616 describes the new alert that is generated by the escalation function. Blank indicates that the description should not change.

The Generated MOs attribute 617 identifies a list of network components that should be put into the alarm state if the escalation condition remains valid after the wait period (if configured). When naming the network components, a symbol can be used to indicate that the location attribute value of the incoming alert should be substituted in the network component name. Note that any combination of symbols that represent attribute values can be used. One could also use a unix-like regular expression to specify which network components the alert(s) should be generated on.

The Generated Alerts 618 attribute stores the names of the new alerts generated on the network components identified above when the escalation condition is satisfied.

The Generated Severities attribute 619 has possible values that include critical, major, minor, warning, indeterminate, and AD with a default of blank. This attribute is used to view or edit the list of severities that should be applied to the alerts identified above if the escalation condition remains valid after the wait period. AD indicates the severity defined in the Alert Definition that is to be used. If this field is left blank, the severity of the incoming alarm is used.

The Generated Descriptions 620 is used to store the descriptions generated on the alert identified above when the escalation condition is satisfied. If this field is left blank, the description in the incoming alarm will be used.

The User Notes attribute 621 stores information about the escalation scenario.

The Create Info attribute 622 tracks and stores the time/date/user ID information for when this escalation scenario was created.

The Update Info attribute 623 tracks and stores the time/date/user ID information for when this escalation scenario was last updated.

The Suppression Scenario attribute 630 is used to identify (or assign) a current suppression scenario (if any) for the control object.

Suppression causes specified alerts to be permanently removed from the Alert Display window when a suppressor alarm is received.

While the suppressor alert is active, subsequent alarms that match the suppression pattern do not display on the Alert Display Window.

There are six typically-used suppression methods: Suppress Transient, Suppress Pattern, Suppress Containment, Suppress Branch, Suppress Equip Range, and Suppress And Gen.

The Suppress Transient method is used for alarms that come and go in a short period of time. The system generates an alert only if a clear is not received within a specified period of time. Otherwise, the system ignores the alarm.

The suppression of patterns method is used for alarms that have a suppressor suppressee relationship. The relationship is defined using lists of alarm names and network components (managed objects) identified in the suppressor control object. The suppressee control objects identify the suppressor.

The Suppress Containment method is based on containment. When this method is triggered by an incoming alarm, the system generates the received alert, and suppresses specified alerts on contained equipment.

The Suppress Branch method is based on containment. When this method is triggered by an incoming alarm, the system suppresses all alerts on the parent network component, and all contained network components, with the exception of the network component that triggered the method. This method can be used for power supply failure scenarios.

The Suppress Equip Range method is also equipment based and suppresses specified alerts names when they are received on a specified range of equipment.

The Suppress And Gen method is used when generation of a different alert for an alarm is desired. When this scenario is activated, the triggering alert is not generated, but the specified alert is generated in its place. This method can be used to clear alerts, when the offnormal condition and the return-to-normal condition messages use different alarm name identifiers.

Another type of suppression scheme is Do not generate alert. This is handled through an Alert Generation form. For example, the system could be configured not to generate 2567 alerts for CCSUs, or not to generate 2567 alerts for a specific device and its components (like an MSC).

The suppression attribute 630 includes a plurality of sub-attributes 631–645. These sub-attributes include Suppression Scenario 631, Suppression Event 632, Suppression Severity 633, Suppression Threshold 634, Suppressor Equipment Range 635, Suppressor MOs 636, Suppressor Alerts 637, Suppressed Equipment Range 638, Suppressed MOs 639, Suppressed Alarms 640, Suppressed Severities 641, Wait Time 642, User Notes 643, Create Info. 644, Update Info. 645.

The Suppression Scenario attribute 631 identifies the name of the Suppression scenario for the control object.

The Suppression Event attribute 632 identifies the method to use for suppressing alarms (or to generate a new alert).

The Suppression Severity attribute 633 specifies the severity level (e.g., critical, major, minor, warning, indeterminate) of an alert (generated from an alarm incident) that will activate this scenario. If the severity of the alert does not match the selected severity, no suppression will occur. Blank means any severity will activate the scenario.

The Suppression Threshold attribute 634 specifies the number of objects or the 25 percentage of objects which must be in alarm for the scenario to be activated. Count applies to range and pattern suppression methods. Percentage applies to the containment and branch suppression methods. This feature will change over time.

The Suppressor Equipment Range attribute 635 is used for the Suppress Equip Range method. It is used to identify the ID ranges of the equipment or network components to act as a suppressor. The range can be for specific IDs (e.g. [1,4,19,90]) or can be a regular expression ([0–9] or [100–200]).

The Suppressor MOs attribute 636 identifies the name of the network component(s) on which the alert must be active for related suppression to be initiated. When naming the network component, a symbol can be used to indicate that the location attribute value of the incoming alert should be substituted in the network component name. Note that any combination of symbols that represent attribute values can be used. A unix-like regular to expression could also be used to specify which network components the alert(s) should be generated on.

The Suppressor Alerts attribute 637 identifies the name of the alert(s) that must be active for related suppression to be initiated.

The Suppressed Equipment Range attribute 638 is used for the Suppress Equip Range method. It stores the ID ranges of the equipment to be suppressed. The range can be for specific IDs (1,4,19,90) or can be a regular expression (0–9) or (100–200).

The Suppressed MOs attribute 639 stores the network components(s) on which the alarms identified in the Suppressed Alarm List attribute must be suppressed if this alarm is received. A symbol can be used to indicate that the location attribute value of the incoming alert should be substituted in the network component name. Note that any combination of symbols that represent attribute values can be used. A unix-like regular expression could also be used to specify which network components the alert(s) should be generated on.

The Suppressed Alarms attribute 640 identifies the alarm(s) that must be suppressed if this alarm is received, and if these alarms are on the network components identified in the Suppressed MO List attribute. It is used for the Related suppression method, else it should be blank. There is an alarm name for each corresponding device (and severity) specified.

The Suppressed Severities attribute 641 identifies the severity level (critical, major, minor, warning, or indeterminate) of the alert to be suppressed. blank means suppress alerts of all severity. If a severity is specified, alerts with the specified severity are suppressed.

The Wait Time attribute 642 specifies the length of time for which the alarm must be active before the alert is generated. This attribute is ONLY used in conjunction with the Transient suppression method, and should otherwise be set to 0 (zero).

The User Notes attribute 643 identifies information about the suppression scenario.

The Create Info attribute 644 tracks and stores the time/date/user ID information for when this suppression scenario was created.

The Update Info attribute 645 tracks and stores the time/date/user ID information for when this suppression scenario was last updated.

New advanced fault management methods will be identified and added to the invention over time. What is particularly relevant is that the invention allows customers to easily add create methods, and to apply these methods through the user interface associated with the invention. New methods are easy to create because they work within the structured framework or context of the invention. This greatly reduces the time required to test and verify changes to management procedures.

Although the present invention and its advantages have been described in detail, it should be understood that various changes, substitutions and alterations can be made herein without departing from the spirit and scope of the invention as defined by the appended claims. For example, a management processor system could include one or more management processors. Again, the management processors of the present invention represent processing functions that could actually be implemented in a variety of manners. Thus, a fault management system could include only one management processor system for implementing fault management on one or more management levels. Moreover, management processor systems may be implemented on any suitable hardware system that may include one or more servers or work stations.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A fault management system, comprising:
    (a) a gateway communicatively connected to a network for receiving an alarm incident, the gateway having a rule engine for (1) selecting a control object from a set of control objects, the selecting being based on information from the alarm incident, and (2) processing the selected control object; and
    (b) a management processing system having a processor for processing configuration objects in response to the selected control object for implementing fault management objectives defined by at least one user.

2. The system of claim 1 further comprising an alert display operably connected to the system for displaying to a user alert information.

3. The system of claim 1, wherein the configuration objects include scenario objects for performing advanced processing.

4. The system of claim 3, wherein the scenario objects include scenario objects for correlating alarm incidents.

5. The system of claim 1, wherein the gateway comprises a plurality of distributed gateways.

6. The system of claim 1, wherein the management processing system includes at least one management processor for managing faults relating to the element layer of the managed system.

7. The system of claim 1, wherein the management processing system is implemented on at least one server.

8. The system of claim 1, wherein the gateway's rule engine for selecting a control object for the incoming alarm incident selects the control object with a name that is closest to corresponding information from the alarm incident.

9. The system of claim 8, wherein the gateway has a normalization engine for extracting identification information from the alarm incident and placing it in a form that is compatible with the control object names for finding the closest control object.

10. The system of claim 1, wherein the control objects may be modified by the user.

11. The system of claim 1, wherein the control objects are formed from a control object class that includes at least one basic processing attribute.

12. The system of claim 11, wherein the control object class further includes at least one advanced processing attribute.

13. A memory device having instructions that when loaded into and executed by at least one computer implements the fault management system of claim 1.

14. A computer-readable medium encoded with instructions for matching in a fault management system an incoming alarm incident to a control object for processing from a set of control objects, the instructions when executed causing the system to perform acts comprising:
    (a) extracting data from an alarm incident received at a gateway;
    (b) said gateway comparing the data with a set of control object names, wherein each name (1) corresponds to a control object, and (2) includes one or more identifiers from different alarm incident identification types; and
    (c) said gateway selecting for processing the control object whose name is closest to the extracted data.

15. The computer-readable medium of claim 14, wherein the act of selecting the control object whose name is closest includes selecting the control object whose name has the most and all of its identifiers matched with the extracted data.

16. The computer-readable medium of claim 15, wherein a default control object is selected if no control object name has all of its identifiers matching the extracted data.

17. The computer-readable medium of claim 14, wherein the system performs acts further comprising processing the selected control object in said gateway.

18. The computer-readable medium of claim 17, wherein the processed control object initiates a scenario object for performing advanced fault management processing.

19. A method for managing faults in a network system, comprising:
    (a) receiving at a gateway an alarm incident that corresponds to a fault;
    (b) said gateway selecting a configuration object from a set of configuration objects for processing the alarm incident, wherein said selecting a configuration object includes (i) extracting data from the alarm incident, (ii) comparing the data with a set of configuration object names, wherein each name (1) corresponds to a configuration object in the set of configuration objects, and (2) includes one or more identifiers from different alarm incident identification types, and (iii) selecting for processing the configuration object whose name is closest to the extracted data; and
    (c) processing the selected configuration object in order to act on the fault according to predefined objectives.

20. The method of claim 19 wherein the act of selecting the configuration object whose name is closest includes selecting the configuration object whose name has the most of its identifiers matched with the extracted data.

21. The method of claim 20, wherein the act of selecting further includes selecting the configuration object whose name has all of its identifiers matched with the extracted data.

22. The method of claim 21, wherein a default configuration object is selected if no control object name has all of its identifiers matching the extracted data.

23. The method of claim 19, wherein the act of processing includes processing the selected configuration object in said gateway.

24. The method of claim 23, wherein the processed configuration object initiates an additional configuration object for performing advanced fault management processing.

25. The method of claim 24, wherein the act of initiating an additional configuration object includes initiating a scenario object.

26. A fault management system, comprising:

a gateway communicatively connected to a network for receiving an alarm incident, the gateway having a rule engine for (1) selecting a control object from a set of control objects, the selecting being based on information from the alarm incident, wherein the rule engine selects the control object with information that is closest to corresponding information from the alarm incident, and (2) processing the selected control object.

27. The fault management system of claim 26 wherein said gateway comprises a processor for processing configuration objects in response to the selected control object for implementing fault management objectives defined by at least one user.

28. The fault management system of claim 27 wherein the configuration objects include scenario objects for performing advanced processing.

29. The fault management system of claim 28, wherein the scenario objects include scenario objects for correlating alarm incidents.

30. The fault management system of claim 26 further comprising:

a management processing system communicatively coupled to said gateway, said management processing system having a processor for processing configuration objects in response to the selected control object for implementing fault management objectives defined by at least one user.

31. The fault management system of claim 26 wherein the gateway comprises a plurality of distributed gateways.

32. The fault management system of claim 26 wherein the gateway includes a normalization engine for extracting identification information from the alarm incident and placing it in a form that is compatible with control object information for finding the closest control object.

33. A fault management system comprising:

a gateway communicatively connected to a network for receiving an alarm incident, the gateway having a rule engine for (1) selecting a control object from a set of control objects, the selecting being based on information from the alarm incident, wherein the control objects are formed from a control object class that includes at least one basic processing attribute, and (2) processing the selected control object.

34. The fault management system of claim 33 wherein the control object class further includes at least one advanced processing attribute.

* * * * *

UNITED STATES PATENT AND TRADEMARK OFFICE
CERTIFICATE OF CORRECTION

PATENT NO. : 6,513,129 B1
DATED : January 28, 2003
INVENTOR(S) : Maarten Tentij et al.

It is certified that error appears in the above-identified patent and that said Letters Patent is hereby corrected as shown below:

<u>Title page,</u>
Item [75], Inventors,
Add -- Mohamed Khalad Sakak, Rancho Cordova (USA) --

<u>Column 3,</u>
Line 28, delete "Hi"
Line 50, delete "," after "number and type"

<u>Column 6,</u>
Line 24, delete "tag"

<u>Column 10,</u>
Line 42, delete "(NM)" and insert -- (NID) --
Line 59, insert space between "2." and "0" to begin a new sentence <u>Column 12,</u>
Line 27, delete "Oust" and insert -- just --

<u>Column 17,</u>
Line 64, delete "25"

Signed and Sealed this

First Day of July, 2003

JAMES E. ROGAN
*Director of the United States Patent and Trademark Office*